United States Patent
Fujioka

(10) Patent No.: US 11,326,737 B2
(45) Date of Patent: May 10, 2022

(54) ROBOT

(71) Applicant: KABUSHIKI KAISHA YASKAWA DENKI, Kitakyushu (JP)

(72) Inventor: Hisashi Fujioka, Kitakyushu (JP)

(73) Assignee: KABISHIKI KAISHA YASKAWA DENKI, Kitakyushu (JP)

( * ) Notice: Subject to any disclaimer, the term of this patent is extended or adjusted under 35 U.S.C. 154(b) by 194 days.

(21) Appl. No.: 16/681,853

(22) Filed: Nov. 13, 2019

(65) Prior Publication Data
US 2020/0158279 A1    May 21, 2020

(30) Foreign Application Priority Data

Nov. 16, 2018   (JP) .............................. JP2018-215254

(51) Int. Cl.
| | |
|---|---|
| B25J 9/00 | (2006.01) |
| F16M 13/02 | (2006.01) |
| F16M 5/00 | (2006.01) |
| F16M 13/00 | (2006.01) |
| B25J 18/00 | (2006.01) |

(52) U.S. Cl.
CPC ............ F16M 13/02 (2013.01); B25J 9/0009 (2013.01); F16M 5/00 (2013.01); F16M 13/005 (2013.01); B25J 18/00 (2013.01); F16M 2200/08 (2013.01)

(58) Field of Classification Search
USPC ... 248/346.01, 346.05, 346.06, 346.4, 346.5, 248/220.21, 220.22; 269/1, 3, 46, 55, 56, 269/58, 71, 81
See application file for complete search history.

(56) References Cited

U.S. PATENT DOCUMENTS

| | | | | |
|---|---|---|---|---|
| 5,102,081 A | * | 4/1992 | Barchus ................. | F16M 11/14 248/181.1 |
| 6,386,502 B1 | * | 5/2002 | Yamagishi ............. | F16M 11/10 248/126 |

(Continued)

FOREIGN PATENT DOCUMENTS

| | | |
|---|---|---|
| CA | 2950973 A1 | 6/2017 |
| JP | 5187182 B2 | 7/2010 |

(Continued)

OTHER PUBLICATIONS

Extended European Search Report for corresponding EP Application No. 19208277.4, dated May 4, 2020.

*Primary Examiner* — Alfred J Wujciak
(74) *Attorney, Agent, or Firm* — Mori & Ward, LLP

(57) ABSTRACT

A robot includes a multi-articular arm and a base including a body. The body has a first supported surface and a second supported surface opposite to the first supported surface. A first bracket and a second bracket are connectable to the first supported surface or to the second supported surface to connect the body to the floor surface or the wall surface. Each of the body, the first bracket, and the second bracket has a mounting member such that the base is mounted on the floor surface when the first bracket is connected to the first supported surface and the second bracket is connected to the second supported surface, and such that the base is mounted on the wall surface when the first bracket is connected to the second supported surface and the second bracket is connected to the first supported surface.

20 Claims, 9 Drawing Sheets

(56) References Cited

U.S. PATENT DOCUMENTS

| | | | |
|---|---|---|---|
| 2007/0045505 A1* | 3/2007 | Chen | F16M 11/041 |
| | | | 248/558 |
| 2008/0037207 A1* | 2/2008 | Chih | F16M 11/10 |
| | | | 361/679.01 |
| 2016/0288340 A1 | 10/2016 | Akaha et al. | |
| 2018/0221904 A1 | 8/2018 | Yoshino et al. | |

FOREIGN PATENT DOCUMENTS

| | | |
|---|---|---|
| JP | 2016-190294 A | 11/2016 |
| JP | 2018-126831 | 8/2018 |

* cited by examiner

ROBOT

CROSS-REFERENCE TO RELATED APPLICATIONS

The present application claims priority under 35 U.S.C. § 119 to Japanese Patent Application No. 2018-215254, filed Nov. 16, 2018. The contents of this application are incorporated herein by reference in their entirety.

BACKGROUND

Field of the Invention

The embodiments disclosed herein relate to a robot.

Discussion of the Background

JP 2018-126831A discloses a robot that includes a multi-articular arm and a base. The base supports the multi-articular arm. The base has a rectangular parallelepiped shape, having six surfaces. One surface of the six surfaces is the surface on which the multi-articular arm is supported, and the other five surfaces serve as installation surfaces so that the robot is both floor-mountable and wall-mountable.

SUMMARY

According to one aspect of the present disclosure, a robot includes a multi-articular arm and a base mountable on a floor surface or a wall surface. The base includes a body, a first bracket, and a second bracket. The body supports a base end portion of the multi-articular arm and has a first supported surface disposed on a first side surface of the body and a second supported surface disposed on a second side surface of the body opposite to the first side surface of the body. The first bracket is connectable to the first supported surface or to the second supported surface to connect the body to the floor surface or the wall surface. The second bracket is connectable to the second supported surface or to the first supported surface to connect the body to the floor surface or the wall surface. Each of the body, the first bracket, and the second bracket has a mounting member such that the base is mounted on the floor surface when the first bracket is connected to the first supported surface and the second bracket is connected to the second supported surface, and such that the base is mounted on the wall surface when the first bracket is connected to the second supported surface and the second bracket is connected to the first supported surface.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

By referring to the accompanying drawings, a robot according to an embodiment of the present disclosure will be described in detail below. It is noted that the following embodiments are provided for example purposes only and are not intended for limiting purposes. Also, while in the following description the robot will be described as being a "vertical multi-articular" robot having six axes, this is not intended as limiting the number of axes and axis configuration of the robot.

As used herein, the term "orthogonal" means, in a broad sense, exactly orthogonal or approximately orthogonal within some tolerance from exactly orthogonal. As used herein, the term "perpendicular" means, in a broad sense, exactly perpendicular or approximately perpendicular within some tolerance from exactly perpendicular. As used herein, the term "parallel" means, in a broad sense, exactly parallel or approximately parallel within some tolerance from exactly parallel. As used herein, the term "vertical" means, in a broad sense, exactly vertical or approximately vertical within some tolerance from exactly vertical. As used herein, the term "symmetry" means, in a broad sense, exactly symmetry or approximately symmetry within some tolerance from exactly symmetry. As used herein, the term "overlapping" means, in a broad sense, exactly overlapping or approximately overlapping within some tolerance from exactly overlapping. As used herein, the teen "same" means, in a broad sense, exactly the same or approximately the same within some tolerance from exactly the same. As used herein, the term "identical" means, in a broad sense, exactly identical or approximately identical within some tolerance from exactly identical. As used herein, the term "equal" means, in a broad sense, exactly equal or approximately equal within some tolerance from exactly equal. Thus, these terms are used taking into consideration production-related, installation-related, processing-related, and detection-related tolerances and errors.

Figure 1:
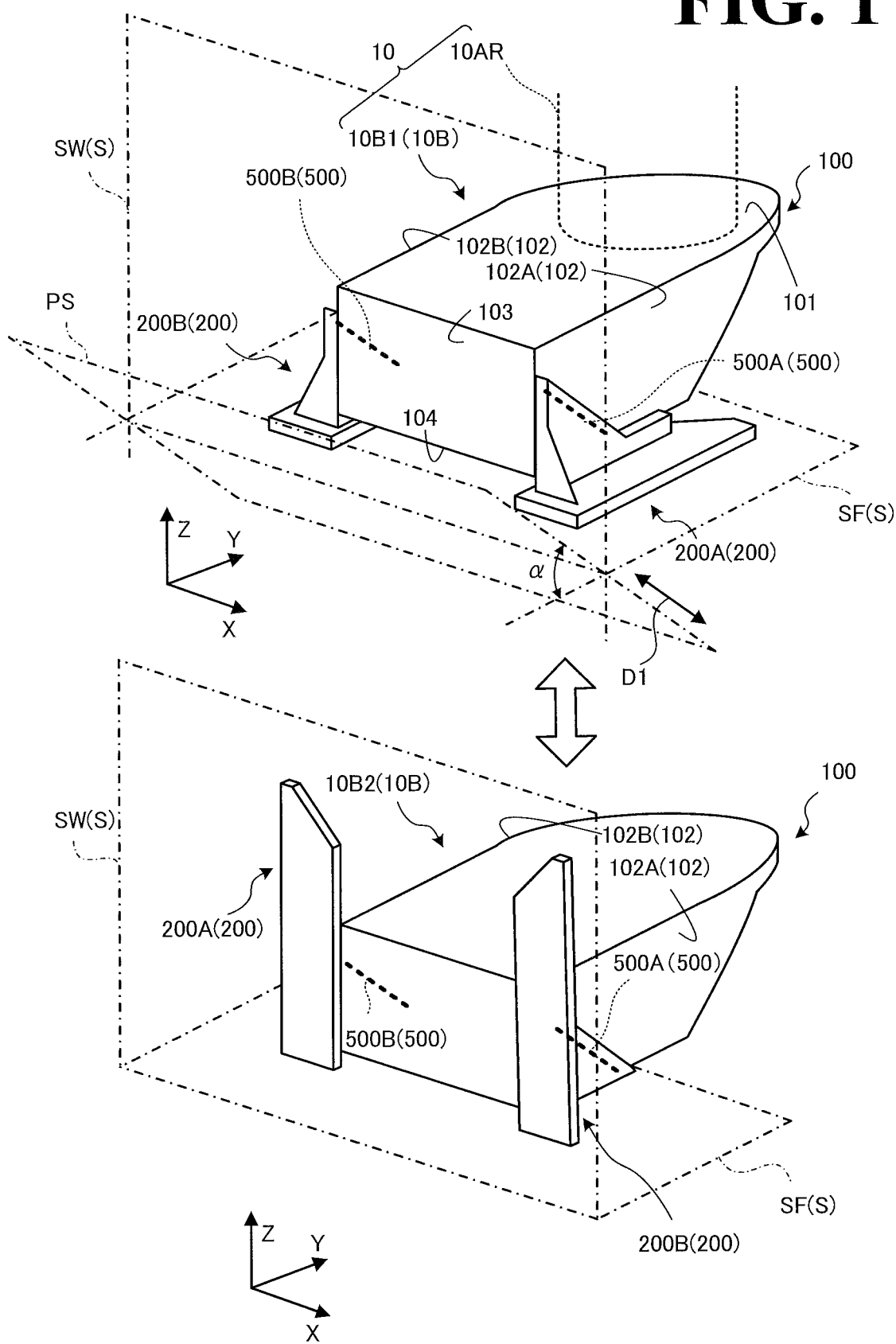
FIG. 1 illustrates an outline of a robot according to the embodiment.

A robot 10 according to this embodiment will be outlined by referring to FIG. 1. FIG. 1 illustrates an overview of the robot 10 according to this embodiment. It is to be noted that FIG. 1 illustrates in detail a configuration of a base 10B of the robot 10 and in less detail a multi-articular atm 10AR of the robot 10, with the existence of the multi-articular arm 10AR being indicated by broken lines and not being provided specific form. It is also to be noted that an example configuration of the robot 10 as a whole will be described later by referring to FIG. 9.

For ease of understanding of the following description, FIG. 1 is appended with a three-dimensional orthogonal coordinate system. In the coordinate system, the vertically upward direction corresponds to the positive direction of Z axis; the vertically downward direction corresponds to the negative direction of the Z axis; the direction toward the rear surface to the front surface of the base 10B corresponds to the negative direction of Y axis; the direction toward the front surface from the rear surface of the base 10B corresponds to the positive direction of the Y axis; the direction to the left side of the base 10B in FIG. 1 corresponds to the negative direction of X axis; and the direction to the right side of the base 10B in FIG. 1 corresponds to the positive direction of the X axis. In the following description, the negative direction of the X axis may occasionally be referred to as the "left side", and the positive direction of the X axis may occasionally be referred to as the "right side". The above-described orthogonal coordinate system may also be illustrated in some other drawings referred to in the following description.

As illustrated in FIG. 1, the base 10B of the robot 10 according to this embodiment includes a body 100 and a pair of brackets 200 (a first bracket 200A and a second bracket 200B).

The body 100 supports a base end portion of the multi-articular arm 10AR, and is fixed to an installation surface S via the pair of brackets 200. The installation surface S is a floor surface SF or a wall surface SW. As used herein, the term "base end portion" of the multi-articular arm 10AR is intended to include the end of the multi-articular arm 10AR on the negative Z side and a portion offset from and proximate to the end of the multi-articular arm 10AR on the negative Z side. The pair of brackets 200 support supported surfaces of the body 100 and fix the body 100 to the installation surface S. While in FIG. 1 the body 100 supports the multi-articular arm 10AR on an upper surface 101 of the body 100, the body 100 may support the multi-articular arm 10AR at any other portion of the body 100 than the upper surface 101.

With this configuration of the base 10B, the pair of brackets 200 are detachable from the body 100, and are interchangeable and mountable back on the body 100 so that the installation surface S is switchable between the floor surface SF and the wall surface SW.

The body 100 has two side surfaces 102 (a first side surface 102A and a second side surface 102B). The first side surface 102A and the second side surface 102B are opposed to each other. The first side surface 102A has a first supported surface, and the second side surface 102B has a second supported surface. The first supported surface is supported by one of the pair of brackets 200, and the second supported surface is supported by the other bracket 200. The two supported surfaces are parallel to the Y-Z plane. That is, the two supported surfaces are parallel to each other. As illustrated in FIG. 1, the body 100 also has a rear surface 103 and a bottom surface 104. The rear surface 103 faces the wall surface SW, and the bottom surface 104 faces the floor surface SF. Specific examples of the supported surfaces will be described later by referring to FIG. 2 and other drawings.

Figure 4:
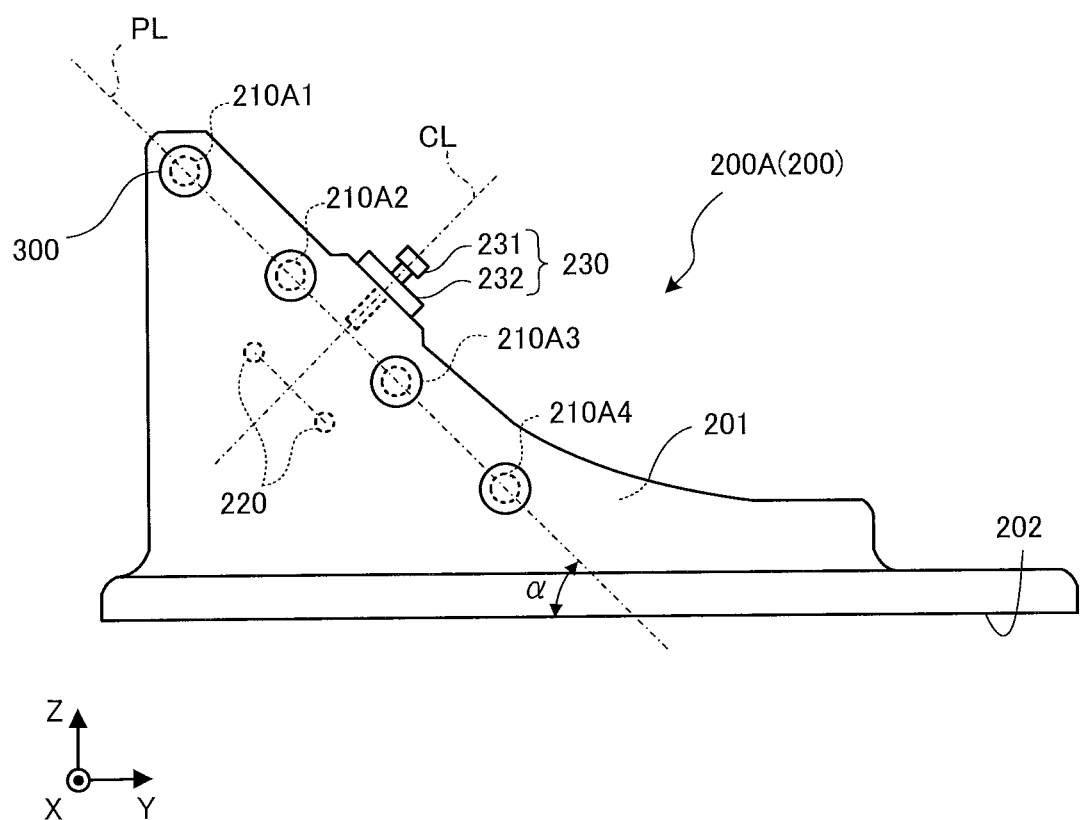
FIG. 4 is a side view of a first bracket taking a floor-mount posture.

Each of the pair of brackets 200 has a first surface 201 and a second surface 202 (see FIG. 4). The first surface 201 is fixed to one supported surface of one side surface 102 of the body 100. The second surface 202 is perpendicular to the first surface 201 and fixed to the installation surface S. With the first surfaces 201 of the pair of brackets 200 superimposed on each other, the pair of brackets 200 are plane-symmetrical to each other with respect to the first surfaces 201 that are superimposed on each other. Details of the first surface 201 and the second surface 202 will be described later by referring to FIG. 4 and other drawings.

The base 10B illustrated in the upper half part of FIG. 1 is a base 10B1. When the base 10B is the base 10B1, the base 10B is mountable on the floor surface SF, with the first bracket 200A fixed to the right side of the body 100 and the second bracket 200B fixed to the left side of the body 100. The base 10B illustrated in the lower half part of FIG. 1 is a base 10B2. When the base 10B is the base 10B2, the base 10B is mountable on the wall surface SW, with the second bracket 200B fixed to the right side of the body 100 and the first bracket 200A fixed to the left side of the body 100.

The body 100 and the pair of brackets 200 each include a fixing member 500. At the mounting member 500, each bracket 200 is changeable to and from the other bracket 200. Specific examples of the mounting member 500 will be described later by referring to FIGS. 2, 4, and other drawings.

The base 10B1 will be described by referring to the upper half part of FIG. 1. The floor surface SF and the wall surface SW are plane-symmetrical to each other with respect to a symmetry surface PS. The mounting members 500 regulate the posture of the body 100 relative to the postures of the pair of brackets 200 in first directions D1, which are parallel to the symmetry surface PS. When there is an angle of 90 degrees between the floor surface SF and the wall surface SW, the angle, α, between the floor surface SF and the symmetry surface PS is 90 degrees or 45 degrees, which is half 90 degrees.

By defining the first directions D1 in the above-described manner, portions of the body 100 to be machined or processed are integrated to the corner defined between the rear surface 103 and the bottom surface 104. This ensures that the side surfaces of the body 100 are effectively used; for example, a sufficient area for a connector or a similar or related device is secured on each side surface of the body 100.

The mounting members 500, which regulate the posture of the body 100 relative to the postures of the pair of brackets 200 in the first directions D1, include a first mounting member 500A and a second mounting member 500B. The first mounting member 500A is disposed on the first side surface 102A, and the second mounting member 500B is disposed on the second side surface 102B.

While in this embodiment the first directions D1 are parallel to the symmetry surface PS illustrated in FIG. 1, another possible symmetry surface between the floor surface SF and the wall surface SW is a surface perpendicular to the symmetry surface PS. That is, the first directions may be parallel to the surface perpendicular to the symmetry surface PS. In this case, the angle α illustrated in FIG. 1 is 135 degrees (45 degrees (which is half 90 degrees)+90 degrees).

The base 10B2 will be described by referring to the lower half part of FIG. 1. To avoid redundancy, those descriptions that have already been made in relation to the base 10B1 will not be repeated. For ease of illustration, the multi-articular arm 10AR illustrated together with the base 10B1 in the upper half part of FIG. 1 is omitted in the lower half part of FIG. 1.

As illustrated in the lower half part of FIG. 1, by interchanging the pair of brackets 200 illustrated in the upper half part of FIG. 1, the installation surface S is switched to the wall surface SW; that is, the installation surface S is switched from the floor surface SF to the wall surface SW. By interchanging the pair of brackets 200 again, the installation surface S is switched from the wall surface SW to the floor surface SF.

Thus, the pair of brackets 200, which are used for installment purposes, are detachable from the body 100, are interchangeable, and are mountable back on the body 100. This configuration makes the robot 10 mountable both on the floor surface SF and the wall surface SW while maintaining the posture of the body 100.

The above configuration also ensures that when the body 100 needs some machining or processing to increase installment accuracy, the portion of the body 100 to be machined or processed can be concentrated on the supported surfaces of the opposed side surfaces 102. This increases the degree of freedom of the shape of the body 100, making the body 100 smaller in size, that is, making the base 10B smaller in size.

Figure 2:
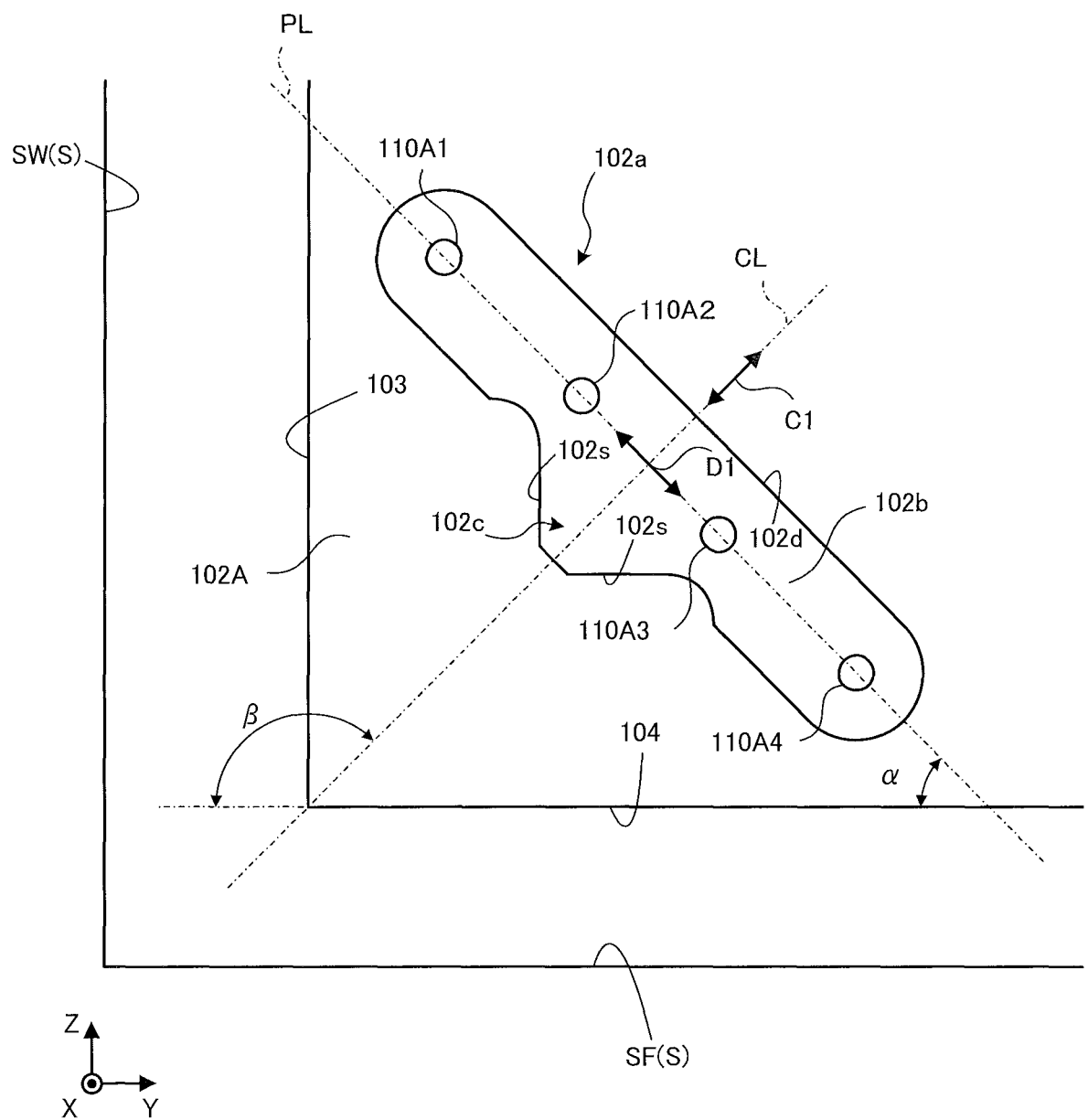
FIG. 2 is a first side view of a first mounting member of a body of a base of the robot.
Figure 3:
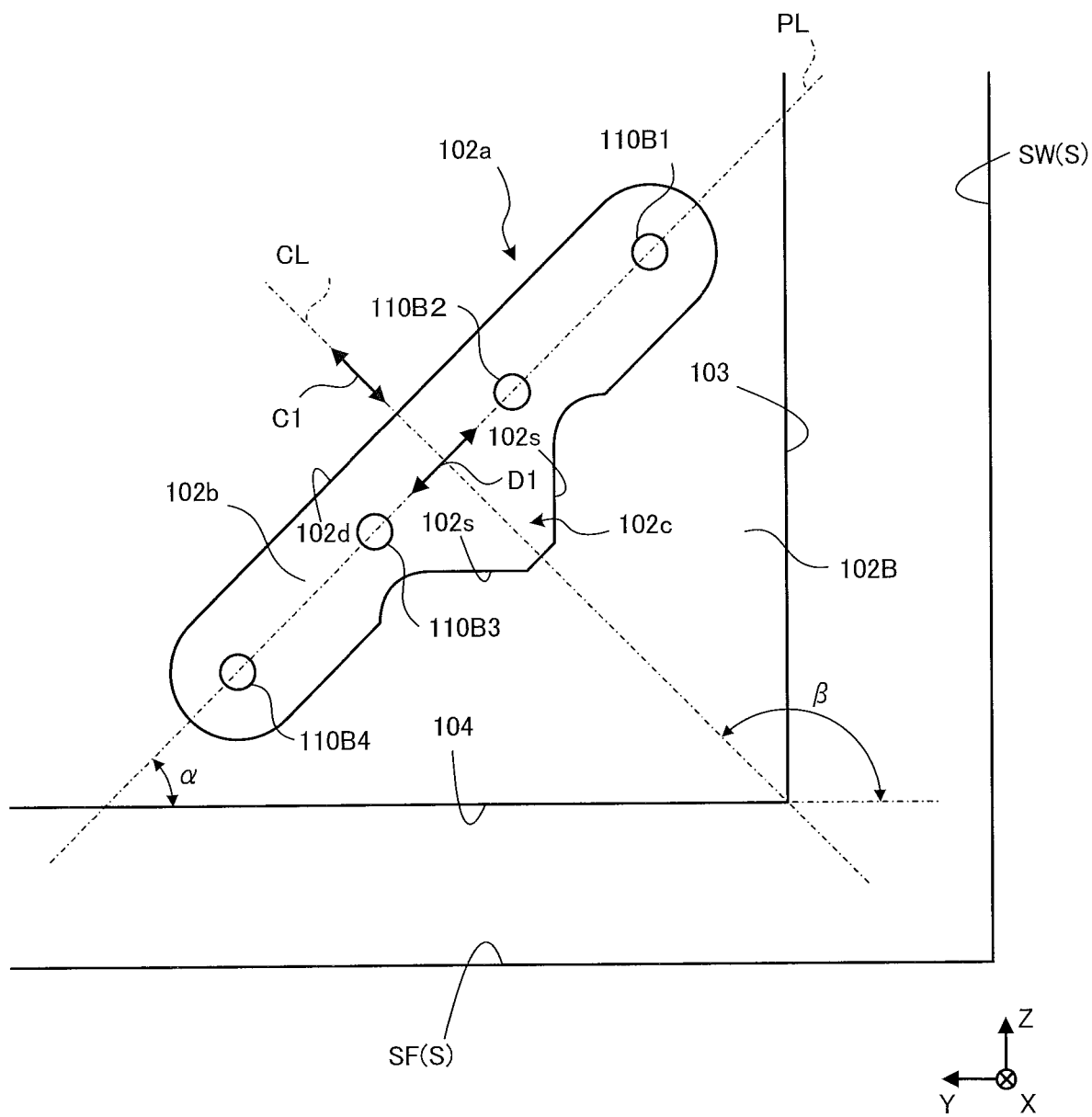
FIG. 3 is a second side view of the first mounting member.

By referring to FIGS. 2 and 3, description will be made with regard to first mounting members 110 of the body 100 of the base 10B. FIG. 2 is a first side view of the first mounting members 110 of the body 100 of the base 10B, and FIG. 3 is a second side view of the first mounting members 110.

FIG. 2, in other words, is a side view of the body 100 illustrated in FIG. 1 as seen from the positive X side. Each of the first mounting members 110 illustrated in FIG. 2 will be denoted "first mounting member 110A", with alphabet "A" added to indicate correspondence with the first side surface 102A (see FIG. 1). Further, each first mounting member 110A will be denoted with one of consecutive numbers to distinguish the each first mounting member 110A from the other first mounting member 110A.

As illustrated in FIG. 2, the first mounting members 110A are fastening holes disposed on a supported surface 102b. The supported surface 102b is disposed on a protrusion 102a. The protrusion 102a protrudes toward the positive X side from the first side surface 102A. The first mounting members 110A are aligned along a pitch line PL. The pitch line PL is parallel to the first directions D1, which is illustrated in FIG. 1 as well. The pitch line PL has an angle α of 45 degrees (which is half 90 degrees) relative to the bottom surface 104.

While the first mounting members 110A may be aligned at equal intervals (pitches), it suffices that the first mounting members 110A are symmetrical to each other with respect to a symmetry line CL. The symmetry line CL has an angle β(=α+90 degrees) of 135 degrees relative to the bottom surface 104. Also, the directions along the symmetry line CL are directions C1.

The supported surface 102b is formed by machining or processing the end surface of the protrusion 102a to be parallel to the Y-Z plane. On the circumferential surface of the protrusion 102a, a positioning portion 102c is disposed. The positioning portion 102c has a machined or processed surface perpendicular to the supported surface 102b. The positioning portion 102c is used to increase the accuracy of mounting of the bracket 200 (see FIG. 1). Also, the positioning portion 102c has a protrusion shape symmetrical with respect to the symmetry line CL, and has a pair of inclined surfaces 102s. The pair of inclined surfaces 102s form a tapered shape. On the circumferential surface of the protrusion 102a opposite to the positioning portion 102c, a pressed surface 102d is disposed. The pressed surface 102d is pressed at the time of positioning of the bracket 200.

As illustrated in FIG. 2, the first mounting members 110A include four first mounting members 110A, namely, a first mounting member 110A1, a first mounting member 110A2, a first mounting member 110A3, and a first mounting member 110A4. The number of the first mounting members 110A, however, may be any other number equal to or more than two, insofar as the first mounting members 110A are symmetrical to each other with respect to the symmetry line CL. When an odd number of first mounting members 110A are provided, the center first mounting member 110A is disposed on the symmetry line CL.

FIG. 3 is a side view of the body 100 illustrated in FIG. 1 as seen from the negative X side. Each of the first mounting members 110 illustrated in FIG. 3 will be denoted "first mounting member 110B", with alphabet "B" added to indicate correspondence with the first side surface 102B (see FIG. 1). Further, each first mounting member 110B will be denoted with one of consecutive numbers to distinguish the each first mounting member 110B from the other first mounting member 110B.

As illustrated in FIG. 3, the first mounting members 110B are fastening holes disposed on the supported surface 102b. The supported surface 102b is disposed on a protrusion 102a. The protrusion 102a protrudes toward the negative X side from the second side surface 102B. The first mounting members 110B are aligned along the pitch line PL. The pitch line PL is parallel to the first directions D1, which is illustrated in FIG. 1 as well. The pitch line PL has an angle α of 45 degrees (which is half 90 degrees) relative to the bottom surface 104.

While the first mounting members 110B may be aligned at equal intervals (pitches), it suffices that the first mounting members 110B are symmetrical to each other with respect to the symmetry line CL. The symmetry line CL has an angle β(=α+90 degrees) of 135 degrees relative to the bottom surface 104. Also, the directions along the symmetry line CL are directions C1.

The supported surface 102b is formed by machining or processing the end surface of the protrusion 102a to be parallel to the Y-Z plane. On the circumferential surface of the protrusion 102a, the positioning portion 102c is disposed. The positioning portion 102c has a machined or processed surface perpendicular to the supported surface 102b. The positioning portion 102c is used to increase the accuracy of mounting of the bracket 200 (see FIG. 1). Also, the positioning portion 102c has a protrusion shape symmetrical with respect to the symmetry line CL, and has the pair of inclined surfaces 102s. The pair of inclined surfaces 102s form a tapered shape. On the circumferential surface of the protrusion 102a opposite to the positioning portion 102c, the pressed surface 102d is disposed. The pressed surface 102d is pressed at the time of positioning of the bracket 200.

As illustrated in FIG. 3, the first mounting members 110B include four first mounting members 110B, namely, a first mounting member 110B1, a first mounting member 110B2, a first mounting member 110B3, and a first mounting member 110B4. The number of the first mounting members 110B, however, may be the same number as the number of the first mounting members 110A such that the first mounting members 110B and the corresponding first mounting members 110A illustrated in FIG. 2 are aligned on the same axis lines along the X axis.

Figure 5:
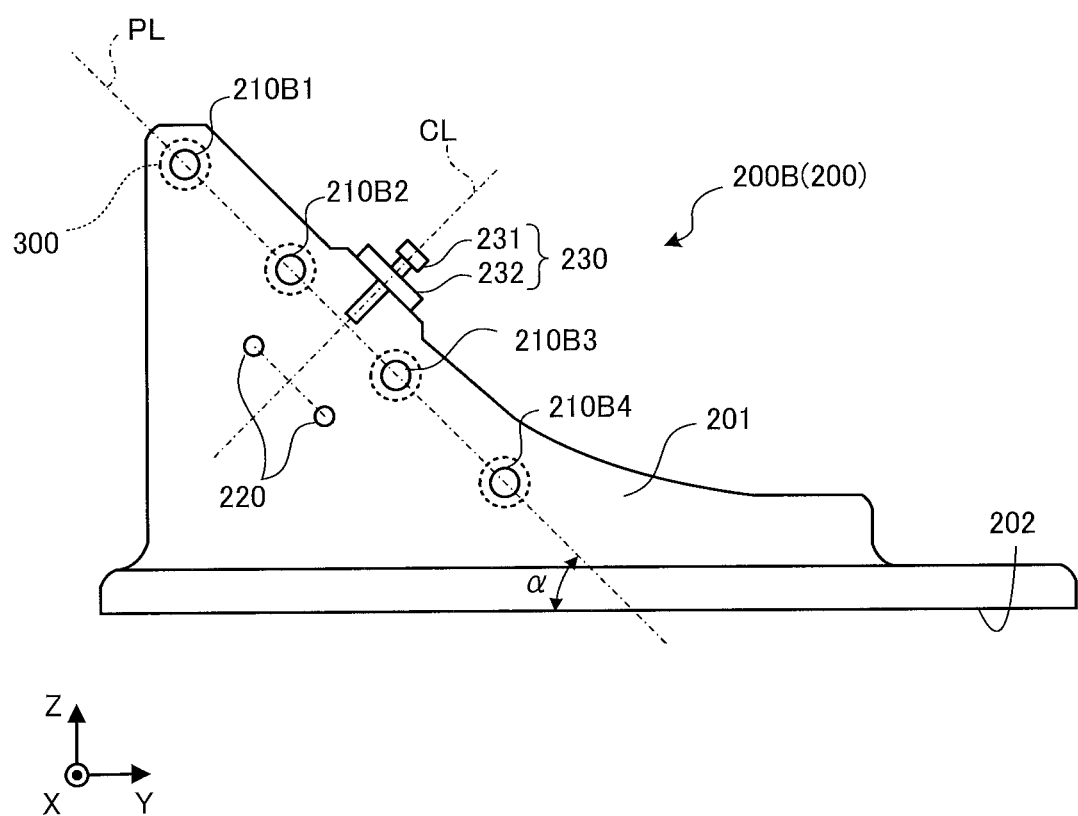
FIG. 5 is a side view of a second bracket taking a floor-mount posture.

By referring to FIGS. 4 and 5, description will be made with regard to the pair of brackets 200 taking floor-mount postures. FIG. 4 is a side view of the first bracket 200A taking a floor-mount posture, and FIG. 5 is a side view of the second bracket 200B taking a floor-mount posture. The posture of the first bracket 200A illustrated in FIG. 4 corresponds to the posture of the first bracket 200A of the base 10B1 illustrated in the upper half part of FIG. 1. The posture of the second bracket 200B illustrated in FIG. 5 corresponds to the posture of the second bracket 200E of the base 10B1 illustrated in the upper half part of FIG. 1. Also, each of FIGS. 4 and 5 is a side view of one bracket 200 as seen from the positive X side, with illustration of the body 100 (see FIG. 1) and the other bracket 200 omitted.

As illustrated in FIG. 4, the first bracket 200A has the first surface 201 and the second surface 202. The first surface 201 is fixed to the supported surface 102b of the body 100 (see FIG. 2). The second surface 202 is perpendicular to the first surface 201 and is fixed to the floor surface SF, which is one installation surface S. The first surface 201 is the surface of the first bracket 200A on the negative X side, and the second surface 202 is the surface of the first bracket 200A on the negative Z side.

The first bracket 200A also includes second mounting members 210A. The second mounting members 210A are aligned along the pitch line PL, which forms an angle of α (45 degrees, which is half 90 degrees) relative to the second surface 202. Each of the second mounting members 210A overlaps, in the X directions, one of the first mounting members 110A illustrated in FIG. 2. The second mounting members 210A are second mounting members 210 corresponding to the first bracket 200A. Also, the second mounting members 210A are through holes penetrating the first bracket 200A. Each of the second mounting members 210A is fixed to the corresponding first mounting member 110A with a fastening member 300.

Specifically, the second mounting member 210A1 is fixed to the first mounting member 110A1; the second mounting member 210A2 is fixed to the first mounting member 110A2; the second mounting member 210A3 is fixed to the first mounting member 110A3; and the second mounting member 210A4 is fixed to the first mounting member 110A4.

The first bracket 200A includes two pins 220. The pins 220 are disposed on the first surface 201 with the circumferential surfaces of the pins 220 contacting the positioning portion 102c illustrated in FIG. 2. Also, the pins 220 protrude from the first surface 201. More specifically, the pins 220 are disposed at positions where the pins 220 are symmetrical to each other with respect to the symmetry line CL, which is illustrated in FIG. 2 as well. The first bracket 200A also includes a pressing member 230. The pressing member 230 is used to press the pressed surface 102d illustrated in FIG. 2. The pressing member 230 includes a bolt 231 and a base 232. The base 232 is fixed to the first bracket 200A.

The bolt 231 penetrates a screw hole through the base 232 along the symmetry line CL and is fastened in the screw hole, thereby pressing the pressed surface 102d illustrated in FIG. 2. Specifically, with the fastening members 300 temporarily in place, the bolt 231 is screwed into the screw hole, thereby pressing the circumferential surfaces of the two pins 220 onto the pair of inclined surfaces 102s of the positioning portion 102c illustrated in FIG. 2. This increases the accuracy of the positioning of the body 100 and the first bracket 200A relative to each other. Also, use of the pins 220 simplifies the positioning of the body 100 and the first bracket 200A relative to each other.

As illustrated in FIG. 5, the second bracket 200B includes the first surface 201 and the second surface 202. The first surface 201 is fixed to the supported surface 102b of the body 100 (see FIG. 3). The second surface 202 is perpendicular to the first surface 201 and is fixed to the floor surface SF, which is one installation surface S. The first surface 201 is the surface of the first bracket 200B on the negative X side, and the second surface 202 is the surface of the first bracket 200B on the negative Z side.

The second bracket 200B also includes second mounting members 210B. The second mounting members 210B are aligned along the pitch line PL, which forms an angle of α (45 degrees, which is half 90 degrees) relative to the second surface 202. Each of the second mounting members 210B overlaps, in the X directions, one of the first mounting members 110E illustrated in FIG. 3. The second mounting members 210B are second mounting members 210 corresponding to the second bracket 200B. Also, the second mounting members 210B are through holes penetrating the second bracket 200B. Each of the second mounting members 210B is fixed to the corresponding first mounting member 110B with a fastening member 300.

Specifically, the second mounting member 210B1 is fixed to the first mounting member 110B1; the second mounting member 210B2 is fixed to the first mounting member 110B2; the second mounting member 210B3 is fixed to the first mounting member 110B3; and the second mounting member 210B4 is fixed to the first mounting member 110B4.

The second bracket 200B includes the two pins 220. The pins 220 are disposed on the first surface 201 with the circumferential surfaces of the pins 220 contacting the positioning portion 102c illustrated in FIG. 3. Also, the pins 220 protrude from the first surface 201. More specifically, the pins 220 are disposed at positions where the pins 220 are symmetrical to each other with respect to the symmetry line CL, which is illustrated in FIG. 3 as well. The second bracket 200B also includes the pressing member 230. The pressing member 230 is used to press the pressed surface 102d illustrated in FIG. 3. The pressing member 230 includes the bolt 231 and the base 232. The base 232 is fixed to the second bracket 200B.

The bolt 231 penetrates the screw hole through the base 232 along the symmetry line CL and is fastened in the screw hole, thereby pressing the pressed surface 102d illustrated in FIG. 3. Specifically, with the fastening members 300 temporarily in place, the bolt 231 is screwed into the screw hole, thereby pressing the circumferential surfaces of the two pins 220 onto the pair of inclined surfaces 102s of the positioning portion 102c illustrated in FIG. 3. This increases the accuracy of the positioning of the body 100 and the second bracket 200B relative to each other.

Figure 6:
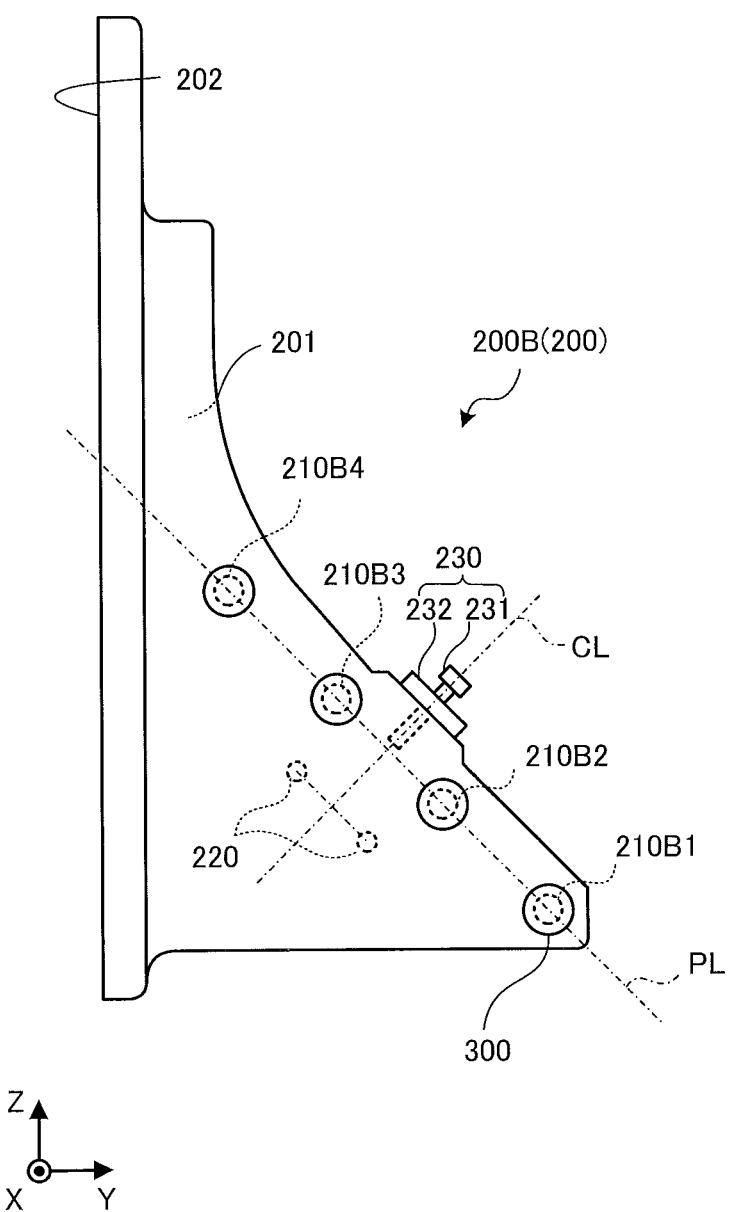
FIG. 6 is a side view of the second bracket taking a wall-mount posture.
Figure 7:
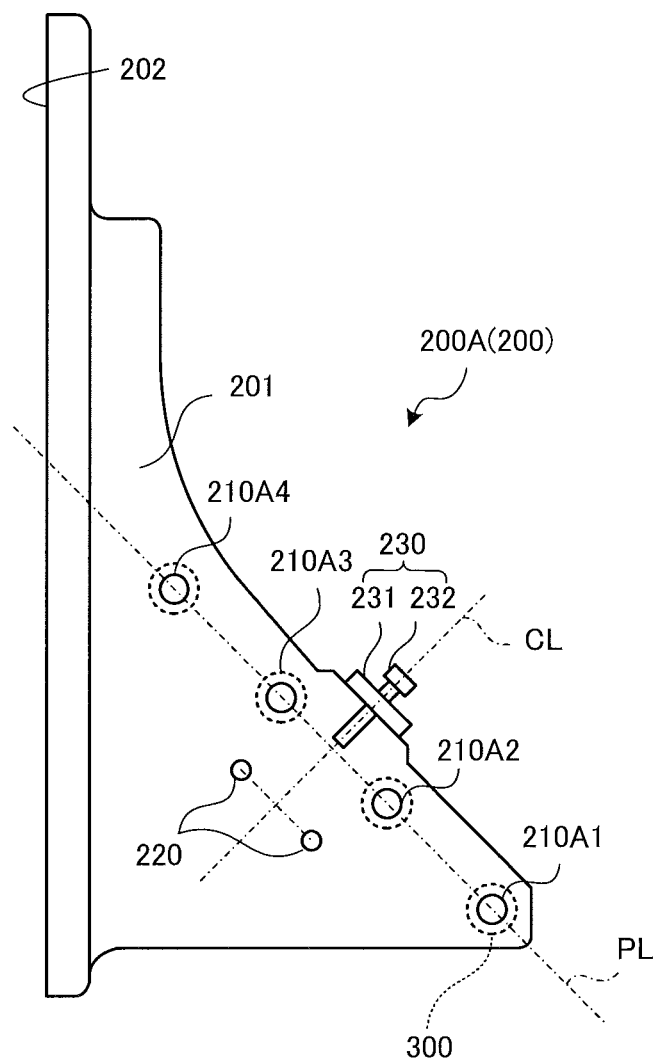
FIG. 7 is a side view of the first bracket taking a wall-mount posture.

By referring to FIGS. 6 and 7, description will be made with regard to the pair of brackets 200 taking wall-mount postures. FIGS. 6 and 7 are different from FIGS. 4 and 5 in that the first bracket 200A and the second bracket 200B are interchanged. The following description will be mainly regarding those respects in which FIGS. 6 and 7 are different from FIGS. 4 and 5.

FIG. 6 is a side view of the second bracket 200B taking a wall-mount posture, and FIG. 7 is a side view of the first bracket 200A taking a wall-mount posture. The posture of the second bracket 200B illustrated in FIG. 6 corresponds to the posture of the second bracket 200B of the base 10B2 illustrated in the lower half part of FIG. 1. The posture of the first bracket 200A illustrated in FIG. 7 corresponds to the first bracket 200A of the base 10B2 illustrated in the lower half part of FIG. 1. Similarly to FIGS. 4 and 5, each of FIGS. 6 and 7 is a side view of one bracket 200 as seen from the positive X side, with illustration of the body 100 (see FIG. 1) and the other bracket 200 omitted.

As illustrated in FIG. 6, the first surface 201 of the second bracket 200B is fixed to the supported surface 102b (see FIG. 2) of the first side surface 102A of the body 100. The second surface 202 of the second bracket 200B is fixed to the wall surface SW, which is the other installation surface S. The first surface 201 of the second bracket 200B faces in the negative X direction, and the second surface 202 of the second bracket 200B faces in the negative Y direction.

The second mounting member 210B4 is fixed to the first mounting member 110A1; the second mounting member 210B3 is fixed to the first mounting member 110A2; the second mounting member 210B2 is fixed to the first mounting member 110A3; and the second mounting member 210B1 is fixed to the first mounting member 110A4;

As illustrated in FIG. 7, the first surface 201 of the first bracket 200A is fixed to the supported surface 102b (see FIG. 3) of the second side surface 102B of the body 100. The second surface 202 of the first bracket 200A is fixed to the wall surface SW, which is the other installation surface S. The first surface 201 of the first bracket 200A faces in the positive X direction, and the second surface 202 of the first bracket 200A faces in the negative Y direction.

The second mounting member 210A4 is fixed to the first mounting member 110B1; the second mounting member 210A3 is fixed to the first mounting member 110B2; the second mounting member 210A2 is fixed to the first mounting member 110B3; and the second mounting member 210A1 is fixed to the first mounting member 110B4.

Figure 8:
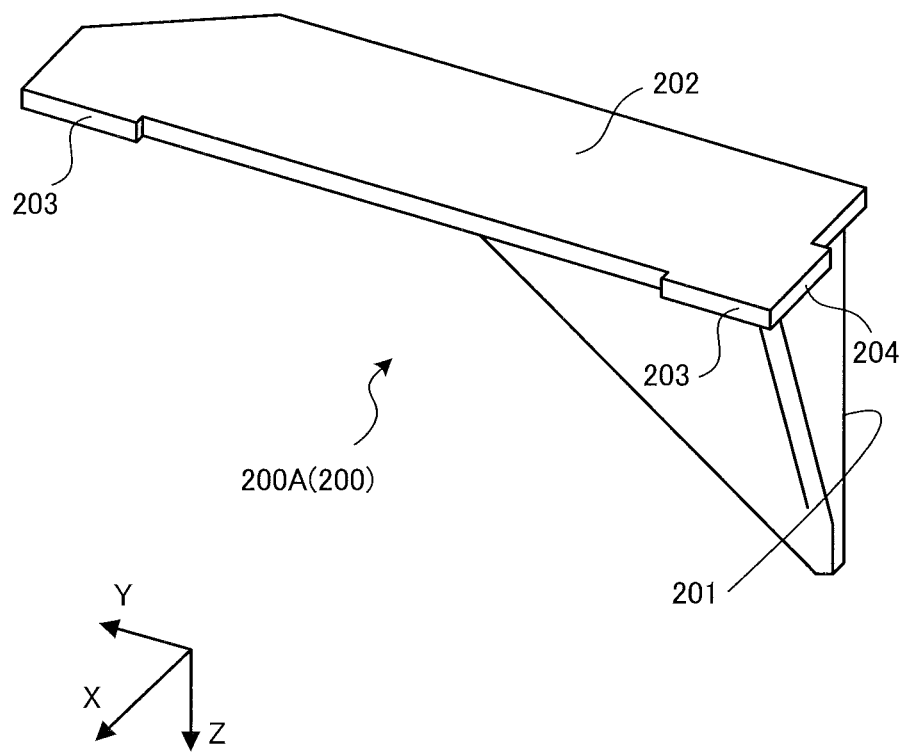
FIG. 8 is a perspective view of a bracket illustrating machined or processed surfaces of the bracket.

By referring to FIG. 8, description will be made with regard to machined or processed surfaces of the first bracket 200A. The machined or processed surfaces of the first bracket 200A are surfaces machined or processed to be adapted to the installation surface S (see FIG. 1). FIG. 8 is a perspective view of the machined or processed surfaces of the first bracket 200A. It is to be noted that FIG. 8 illustrates the first bracket 200A alone, with illustration of the second bracket 200B omitted. This is because when the first surface 201 of the first bracket 200A and the first surface 201 of the second bracket 200B are superimposed on each other, the first bracket 200A and the second bracket 200B form a plane symmetry with respect to the first surfaces 201 superimposed on each other.

As illustrated in FIG. 8, the first bracket 200A has two third surfaces 203 and a fourth surface 204 on a circumferential surface surrounding the circumference of the second surface 202, which is an end surface of the first bracket 200A. The third surfaces 203 and the fourth surface 204 are perpendicular to the second surface 202 and perpendicular to each other. While in FIG. 8 the two third surfaces 203 are separate from each other, the two third surfaces 203 are included in a plane parallel to the Y-Z plane. Also, the fourth surface 204 is included in a plane parallel to the X-Z plane.

The two third surfaces 203 are used for the positioning of the first bracket 200A in an X axis coordinate system, and the fourth surface 204 is used for the positioning of the first bracket 200A in a Y axis coordinate system. Thus, machined or processed surfaces perpendicular to the second surface 202 are provided for the purpose of increasing installment accuracy. This increases the accuracy of the positioning of the first bracket 200A relative to the installation surface S.

Also as illustrated in FIG. 8, the third surfaces 203 and the fourth surface 204 are provided on part of the circumferential surface surrounding the circumference of the second surface 202, which is an end surface of the first bracket 200A, instead of being provided on the entire circumferential surface surrounding the second surface 202. This reduces the area occupied by the machined or processed surfaces, resulting in a reduction in machining or processing cost.

Figure 9:
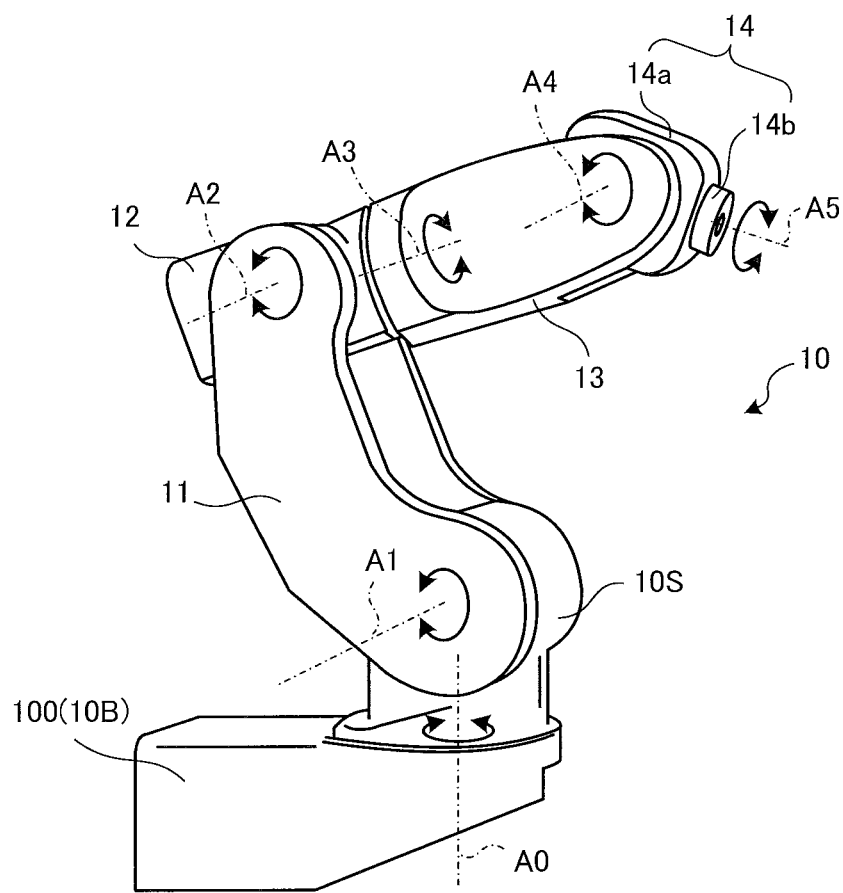
FIG. 9 is a perspective view of the robot.

An example of the robot 10 provided with the base 10B will be described by referring to FIG. 9. FIG. 9 is a perspective view of the robot 10. As illustrated in FIG. 9, the robot 10 is a "vertical multi-articular robot" having six axes, namely, turning axis A0, first axis A1, second axis A2, third axis A3, fourth axis A4, and fifth axis A5. Since the robot 10 is a six-axis robot, the robot 10 has three degrees of freedom about the position of a leading end portion of the robot 10, and has three degrees of freedom about the orientation of the leading end portion of the robot 10. As used herein, the term "leading end portion" of the robot 10 is intended to include the leading end of the robot 10 and a portion offset from and proximate to the leading end of the robot 10. That is, the leading end portion of the robot 10 is adjustable to any three-dimensional position and in any three-dimensional orientation.

As illustrated in FIG. 9, the robot 10 includes (in increasing order of distance from the base) the base 10B, which is illustrated in FIG. 1 and other drawings, a turnable member 10S, a first arm 11, a second arm 12, a third arm 13, and a wrist 14. It is to be noted that the pair of brackets 200 of the base 10B is omitted, with the body 100 illustrated. The multi-articular arm (an example of a multi-articular robot arm) 10AR has the base end portion and a distal end portion which is configured to hold a working tool. The turnable member 10S, the first arm 11, the second arm 12, the third arm 13, and the wrist 14 correspond to the multi-articular arm 10AR illustrated in FIG. 1. Any working tool is attachable and detachable to and from a leading end portion of the wrist 14. As used herein, the term "leading end portion" of the wrist 14 is intended to include the end of the wrist 14 at which a working tool is attached and a portion offset from and proximate to the end of the wrist 14 at which a working tool is attached.

As used herein, the term "arm" is intended to include the wrist 14 and the turnable member 10S, as well as the first arm 11, the second arm 12, and the third arm 13. That is, any movable member of the robot 10 that is capable of making rotational, turning, or swinging movement is referred to as "arm".

The base 10B has already been detailed above by referring to FIG. 1 and other drawings and will not be elaborated upon here. The turnable member 10S is supported by the base 10B and is turnable about the turning axis A0, which extends vertically. The first arm 11, at its base end portion, is supported by the turnable member 10S and is turnable about the first axis A1, which is perpendicular to the turning axis A0. The second arm 12, at its base end portion, is supported by a leading end portion of the first arm 11, and is turnable about the second axis A2, which is parallel to the first axis A1.

The third arm 13, at its base end portion, is supported by a leading end portion of the second arm 12, and is turnable about the third axis A3, which is perpendicular to the second axis A2. The wrist 14 includes a turnable member 14a and a rotatable member 14b. The turnable member 14a, at its base end portion, is supported by a leading end portion of the third arm 13, and is turnable about the fourth axis A4, which is perpendicular to the third axis A3.

The rotatable member 14b, at its base end portion, is supported by a leading end portion of the turnable member 14a, and is rotatable about the fifth axis A5, which is orthogonal to the fourth axis A4. The above-described working tool is attachable and detachable to and from a leading end portion of the rotatable member 14b. It is to be noted that the turnable member 14a and the rotatable member 14b are hollow on the inside so that cables and tubes connected to the working tool are passed through the hollow portions of these members. This eliminates the need for routing cables and/or wires on and around the wrist 14, resulting in improved workability of the robot 10.

It is to be noted that the robot 10 illustrated in FIG. 9 is provided for exemplary purposes only, and the base 10B illustrated in FIG. 1 and other drawings is applicable to any other multi-articular arms axis of any axis number and axis configuration.

As has been described hereinbefore, the robot 10 according to this embodiment includes the multi-articular arm 10AR and the base 10B. The base 10B supports the base end portion of the multi-articular arm 10AR, and is fixed to the installation surface S, which is the floor surface SF or the wall surface SW. The base 10B includes the body 100 and the pair of brackets 200. The body 100 supports the base end portion of the multi-articular arm 10AR, and has the supported surfaces 102b on the respective side surfaces 102, which are opposed to each other.

The pair of brackets 200 support the respective supported surfaces 102b of the body 100 and fix the body 100 to the installation surface S. The body 100 and the pair of brackets 200 include the mounting members 500. The mounting members 500 make the pair of brackets 200 interchangeable on the body 100 to make the body 100 selectively mountable on the floor surface SF and the wall surface SW.

Thus, the base of the robot is made up of separate components, namely, the body and the pair of brackets. By interchanging the pair of brackets, the installation surface is switchable between the floor surface and the wall surface without changing the posture of the body. This ensures that the robot is provided with a smaller-size base.

While in the above-described embodiment the installation surface is switchable between a floor surface and a wall surface, the installation surface may be switchable between a ceiling surface and a wall surface. While in the above-described embodiment the wall surface and the floor surface are perpendicular to each other, the above-described robot is also applicable in the case where the wall surface and the floor surface are not perpendicular to each other, insofar as the above-described first directions are parallel to a symmetry surface between the wall surface and the floor surface.

Also in the above-described embodiment, the mounting members are such that the first mounting members of the body are a row of holes in the first directions, that the second mounting members of the bracket are a row of through holes in the first directions, and that the body and the bracket are fixed to each other with fastening members passed through the holes. This configuration, however, is not intended in a limiting sense; the body and the bracket may be fixed to each other with any other variations known in the art, such as holes, pins, and stud bolts. Another possible example is that the mounting members are a combination of a depression and a protrusion fitted with each other in the first directions, fixing the body and the bracket to each other.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot comprising:
    a multi-articular robot arm having a base end portion and a distal end portion configured to hold a working tool; and
    a base comprising:
        a body connected to the base end portion of the multi-articular robot arm to support the multi-articular robot arm and comprising:
            a first supported surface disposed on a first side surface of the body; and
            a second supported surface disposed on a second side surface of the body opposite to the first side surface,
            the second supported surface facing the first supported surface;
        a first bracket constructed such that the first bracket is connected to the first supported surface and a floor surface when the body is mounted on the floor and that the first bracket is connected to the second supported surface and a wall surface when the body is mounted on the wall; and
        a second bracket constructed such that the second bracket is connected to the second supported surface and the floor surface when the body is mounted on the floor and such that the second bracket is connected to the first supported surface and the wall surface when the body is mounted on the wall.

2. The robot according to claim 1, wherein the floor surface and the wall surface are perpendicular to each other.

3. The robot according to claim 1, wherein each of the body, the first bracket, and the second bracket has a mounting member.

4. The robot according to claim 3,
    wherein the mounting member of the body comprises
        a plurality of first mounting members that are disposed on the first supported surface of the body and that are aligned in a first direction parallel to a symmetry surface disposed between the floor surface and the wall surface, and
        a plurality of other first mounting members that are disposed on the second supported surface of the body and that are aligned in the first direction,
    wherein each of the first bracket and the second bracket comprises
        a first surface connectable to the first supported surface or the second supported surface of the body, and
        a second surface perpendicular to the first surface and connectable to the floor surface or the wall surface, and
    wherein the mounting member of each of the first bracket and the second bracket comprises a plurality of second mounting members that are disposed on the first surface, that are aligned in the first direction, and that are fixed to the plurality of respective first mounting members.

5. The robot according to claim 4,
    wherein the plurality of first mounting members comprise a plurality of fastening holes aligned in the first direction,
    wherein the plurality of second mounting members comprise a plurality of through holes corresponding to the plurality of respective fastening holes, and
    wherein the base further comprises fastening members penetrating the plurality of respective through holes and fitted in the plurality of respective fastening holes to fasten the body to the first bracket and the second bracket.

6. The robot according to claim 5, wherein the first direction comprises an upwardly oblique direction as viewed from the floor surface, and comprises a downwardly oblique direction as viewed from the wall surface.

7. The robot according to claim 6,
    wherein the body comprises
        a first protrusion which protrudes from the first side surface of the body and on which the first supported surface of the body is disposed, and
        a second protrusion which protrudes from the second side surface of the body and on which the second supported surface of the body is disposed, and
    wherein the first protrusion and the second protrusion each comprise a positioning portion for positioning of the first bracket or the second bracket, the positioning portion being disposed on a circumferential surface of the first protrusion perpendicular to the first supported surface of the body or on a circumferential surface of the second protrusion perpendicular to the second supported surface of the body.

8. The robot according to claim 7, wherein the first bracket and the second bracket each comprise a plurality of pins protruding from the first surface with circumferential surfaces of the plurality of pins contacting the positioning portion.

9. The robot according to claim 8,
wherein the positioning portion has a protrusion shape having inclined surfaces symmetrical to each other with respect to a symmetry line with respect to which the plurality of fastening holes aligned in the first direction are symmetrical to each other,
wherein the plurality of pins comprise two pins aligned in the first direction at positions on the first bracket or the second bracket where the protrusion shape of the positioning portion is held between the two pins, and
wherein the first bracket and the second bracket each comprise a pressing member for pressing the body toward the positioning portion along the symmetry line.

10. The robot according to claim 9, wherein the first bracket and the second bracket each comprise a third surface and a fourth surface that are disposed on a circumferential surface surrounding a circumference of the second surface, that are perpendicular to the second surface, and that are perpendicular to each other.

11. The robot according to claim 8, wherein the first bracket and the second bracket each comprise a third surface and a fourth surface that are disposed on a circumferential surface surrounding a circumference of the second surface, that are perpendicular to the second surface, and that are perpendicular to each other.

12. The robot according to claim 7, wherein the first bracket and the second bracket each comprise a third surface and a fourth surface that are disposed on a circumferential surface surrounding a circumference of the second surface, that are perpendicular to the second surface, and that are perpendicular to each other.

13. The robot according to claim 7, wherein the floor surface and the wall surface are perpendicular to each other.

14. The robot according to claim 6, wherein the first bracket and the second bracket each comprise a third surface and a fourth surface that are disposed on a circumferential surface surrounding a circumference of the second surface, that are perpendicular to the second surface, and that are perpendicular to each other.

15. The robot according to claim 6, wherein the floor surface and the wall surface are perpendicular to each other.

16. The robot according to claim 5, wherein the first bracket and the second bracket each comprise a third surface and a fourth surface that are disposed on a circumferential surface surrounding a circumference of the second surface, that are perpendicular to the second surface, and that are perpendicular to each other.

17. The robot according to claim 5, wherein the floor surface and the wall surface are perpendicular to each other.

18. The robot according to claim 4, wherein the first bracket and the second bracket each comprise a third surface and a fourth surface that are disposed on a circumferential surface surrounding a circumference of the second surface, that are perpendicular to the second surface, and that are perpendicular to each other.

19. The robot according to claim 4, wherein the floor surface and the wall surface are perpendicular to each other.

20. The robot according to claim 1, wherein the first bracket is separate from the second bracket.

* * * * *